3,097,909
PROCESS FOR DYEING OR PRINTING FIBROUS MATERIALS OF AROMATIC POLYESTERS
Paul Rhyner, Basel, Paul Grossmann, Binningen, and Raymond Defago, Riehen, Switzerland, assignors to Ciba Limited, Basel, Switzerland, a company of Switzerland
No Drawing. Filed Sept. 7, 1960, Ser. No. 54,349
Claims priority, application Switzerland Sept. 23, 1959
5 Claims. (Cl. 8—39)

This invention is based on the observation that valuable dyeings and prints on fibrous materials of aromatic polyesters, especially polyethylene terephthalates, can be produced by using as dyestuff an α-hydroxy-α-aryl aminoanthraquinone which is free from sulfonic acid groups and of which the aryl radical is substituted by a radical of the formula

—COOR in which R represents a hydrogen atom or an alkyl or aralkyl radical.

The α-hydroxy-α-arylaminoanthraquinones in the process advantageously contain as the aryl radical a phenyl radical. Of special interest are 1-hydroxy-4-phenylaminoanthraquinones, 1:5-dihydroxy-4-nitro-8-phenylaminoanthraquinones, 1:8-dihydroxy-4-nitro-5-phenylaminoanthraquinones, 1:5-dihydroxy-4-amino-8-phenylaminoanthraquinones and 1:8-dihydroxy-4-amino-5-phenylaminoanthraquinones, which contain in the phenyl radical a carboxyl group of the above formula. The compounds first mentioned above can be obtained by methods in themselves known by reaction of leuco-1:4-dihydroxyanthraquinone or 1:5-dihydroxy-4:8-dinitro- or 1:8-dihydroxy-4:5-dinitroanthraquinone with an aminobenzene containing a radical of the formula

—COOR in which R represents a hydrogen atom or an alkyl or aralkyl radical, and advantageously an aliphatic hydrocarbon radical and more especially the alkyl radical containing 1 to 4 carbon atoms. R may represent, for example, a hydrogen atom or a methyl, ethyl, β-methoxyethyl, β-cyanethyl, or a benzyl radical. The aminobenzene radical, may, for example, contain an esterified carboxyl group in ortho-, para- or in meta-position, to the amino group, or two or more esterified carboxyl groups, as for example, in the case of the radical of 5-aminobenzene-1:3-dicarboxylic acid ester. The aminobenzene radical may contain, in addition to the esterified carboxyl group or groups, further substituents, for example, halogen atoms, methyl groups or alkoxy groups.

The 1:5-dihydroxy-4-amino-8-phenylaminoanthraquinones and the 1:8-dihydroxy-4-amino-5-phenylaminoanthraquinones can be obtained by reducing the corresponding dihydroxynitro-phenylaminoanthraquinones by known methods.

Instead of using a single dyestuff of the kind defined above there may be used a mixture of such dyestuffs, and the affinities of such mixtures are often greater than the affinity of a single dyestuff. There may be used mixtures of different dyestuffs of the kind defined above, for example, a mixture of a 1:5-dihydroxy-4-nitro-8-phenylaminoanthraquinone with 1:8-dihydroxy-4-nitro-5-phenylaminoanthraquinone, or a mixture of a dyestuff of the kind defined above with a different dyestuff of similar constitution, for example, a mixture of a 1:5-dihydroxy-4-nitro-8-phenylamino or 1:8-dihydroxy-4-nitro-5-phenylamino-anthraquinone containing in the phenyl radical an esterified carboxyl group with a 1:5-dihydroxy-4-nitro-5-phenylaminoanthraquinone of which the phenyl radical is unsubstituted or substituted otherwise than by an esterified carboxyl group.

The aforesaid dyestuffs are advantageously used for dyeing in a finely dispersed form and in the presence of a dispersing agent, such as a soap, sulfite cellulose waste liquor or a synthetic detergent, or a mixture of different wetting and dispersing agents. It is generally of advantage before dyeing to convert the dyestuff to be used into a dyestuff preparation which contains a dispersing agent and the finely dispersed dyestuff, and which preparation yields on dilution with water a fine dispersion. Such dyestuff preparations can be made in known manner, for example, by reprecipitating the dyestuff from sulfuric acid and grinding the suspension so obtained with sulfite cellulose waste liquor, if desired, also by grinding the dyestuff in a highly efficient grinding apparatus in the dry or wet state in the presence or absence of a dispersing agent.

In order to produce strong dyeings on polyethylene terephthalate fibers it is of advantage to incorporate with the dyebath a swelling agent, or to carry out the dyeing process under superatmospheric pressure at a temperature above 100° C., for example, at 120° C. As swelling agents there may be used aromatic carboxylic acids, for example, benzoic acid or salicyclic acid, phenols, such as ortho- or para-hydroxydiphenyl, or aromatic halogen-compounds, for example, chlorobenzene, ortho-dichlorobenzene or trichlorobenzene, phenyl methyl carbinol or diphenyl. When the dyeing is carried out under superatmospheric pressure it is of advantage to render the dyebath weakly acid, for example, by the addition of a weak acid, for example, acetic acid. The dyeings so obtained are distinguished by their excellent fastness to sublimation and light.

The following examples illustrate the invention, the parts and percentages being by weight unless otherwise stated, and the relationship of parts by weight to parts by volume being the same as that of the kilogram to the liter.

*Example 1*

One part of the aqueous paste of the dyestuff of the formula (1)
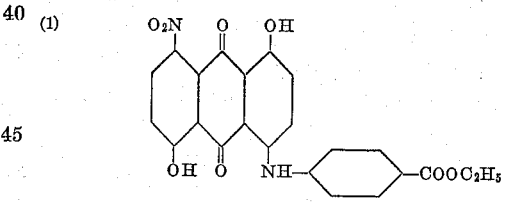

is ground with approximately one part of dried sulfite cellulose waste liquor in a rollermill to form a fine paste having a dyestuff content of about 10%.

100 parts of a fibrous material of polyethyleneterephthalate are first cleaned for half an hour in a bath which contains in 1,000 parts of water 1 to 2 parts of the sodium salt of N-benzyl-μ-heptadecyl-benzimidazole-disulfonic acid and one part of a concentrated aqueous solution of ammonia. The material is then entered into a dyebath consisting of 3,000 parts of water in which the dyestuff paste described above has been dispersed with the aid of four parts of the sodium salt of N-benzyl-μ-hepta-decyl-benzimidazole-disulfonic acid. The whole is heated in an autoclave to 120° C. and maintained at that temperature for about half an hour. The material is then rinsed and, if necessary, washed for half an hour at 60 to 80° C. with a solution containing, in 1,000 parts of water, one part of the sodium salt of N-benzyl-μ-heptadecyl-benzimidazole-disulfonic acid. There is obtained a strong blue dyeing of excellent fastness to sublimation and light.

A very similar dyeing can be produced by using instead of the dyestuff of the Formula 1, 1,5-dihydroxy-4-nitro-8-(meta-, ortho- or para-carboxyphenyl)-aminoanthraquinone.

The dyestuff mentioned in the first paragraph of this example can be obtained as follows:

6.6 parts of 1:5-dihydroxy-4:8-dinitroanthraquinone are heated with
6.6 parts of para-amino-benzoic acid ethyl ester in
30 parts of nitrobenzene for 10 hours at 150 to 180° C.

After cooling the mixture the dyestuff is precipitated by the addition of methanol and separated. The dyestuff may be dispersed in the crude state or may first be purified by reprecipitation in the usual manner. 1:5-dihydroxy-4-nitro-8-(meta-, ortho- or para-carboxyphenyl)-amino anthraquinone may be obtained in analogous manner by using ortho-, meta- or para-aminobenzoic acid instead of para-aminobenzoic acid ethyl ester.

*Example 2*

By using in the process described in Example 1 the dyestuff of the formula (2) 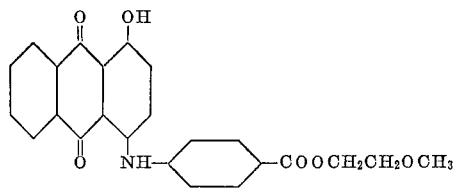

there is obtained on polyester fibers a blue-violet dyeing of very good fastness to light and sublimation.

A very similar dyeing can be produced by using, instead of the methoxy-ethyl ester of the Formula 2 the corresponding benzyl ester.

The compound of the Formula 2 can be obtained as follows:

8 parts of quinizarin and 4 parts of leuco-quinizarin are heated with 6 parts of boric acid and 15 parts of m-aminobenzoic acid-β-methoxy ethyl ester in 60 parts of methylglycol at 90 to 110° C. until all the quinizarin has reacted, which can be recognised by microscopic or spectroscopic examination (sulfuric acid-boric acid solution). The mixture is filtered in the cold, and the filter radical is washed with methanol. The dyestuff so obtained dissolves in organic solvents to give a blue-violet coloration.

The benzyl ester can be obtained in an analogous manner.

*Example 3*

The procedure is the same as described in Example 1, except that the dyestuff of the formula (3) 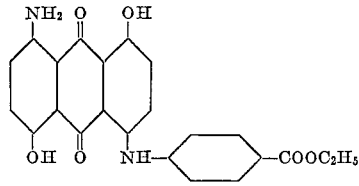

is used. There are obtained on polyester fibers strong blue dyeings of good fastness to light and sublimation.

The dyestuff of Formula 3 can be obtained by reducing 1:5 - dihydroxy - 4 - nitro - 8 - (para-carbalkoxyphenyl)-aminoanthraquinone with sodium sulfide in aqueous solution.

*Example 4*

100 parts of a fibrous material of polyethylene terephthalate are first cleaned for half an hour in a bath which contains in 1,000 parts of water 1 to 2 parts of the sodium salt of N - benzyl-μ-heptadecyl - benzimidazole-disulfonic acid and one part of a concentrated aqueous solution of ammonia. The material is then subjected to swelling for half an hour at 50° C. in a dyebath which contains in 3,000 parts of water 9 parts of ortho-hydroxydiphenyl and 3 parts of diammonium phosphate there is added a dyestuff paste obtained as described in the first paragraph of Example 1. The bath is raised to the boil in the course of half to three-quarters of an hour and dyeing is carried out for one to one and a half hours at a temperature as near as possible to the boiling temperature. The material is then rinsed well and, if desired, washed with a solution which contains in 1,000 parts of water, 1 part of the sodium salt of N-benzyl-μ-heptadecyl-benzimidazole-disulfonic acid for half an hour at 60 to 80° C. There is obtained a blue-dyeing of excellent fastness to sublimation and light.

*Example 5*

A stock thickening is prepared from the following ingredients:

300 parts of gum arabic (1:1)
300 parts of crystal gum (1:2)
250 parts of water
40 parts of cyclohexanone
40 parts of thiodiglycol
50 parts of a solution of 100% strength of the sodium salt of m-nitrobenzene sulfonic acid
20 parts of mixture of potassium oleate and pine oil 1000 parts In 800 parts of the stock thickening 200 parts of the dyestuff obtained as described in the first paragraph of Example 1, are stirred with the use of a high speed stirrer until the dyestuff is completely dispersed. Fabric of polyethylene terephthalate is printed with the resulting paste. After being printed, the fabric is dried and steamed for 45 minutes under a pressure 0.75 atmosphere (gauge), then centrifuged and dried. There is obtained a fast blue print.

What is claimed is:

1. Polyethylene terephthalate fibers dyed with a dyestuff of the formula

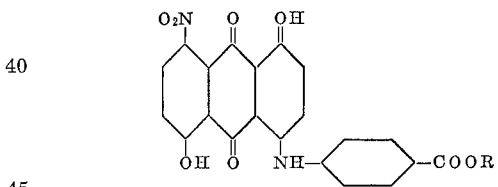

in which R represents a member selected from the group consisting of lower alkyl, lower alkoxyalkyl and benzyl.

2. A dyeing and printing preparation which contains in a finely dispersed form the dyestuff used in claim 1.

3. Polyethylene terephthalate fibers dyed with the dyestuff of the formula

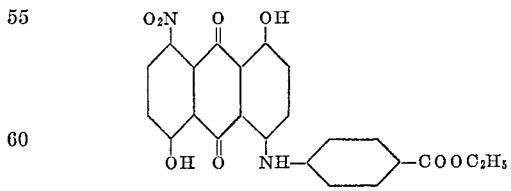

4. Polyethylene terephthalate fibers dyed with the dyestuff of the formula

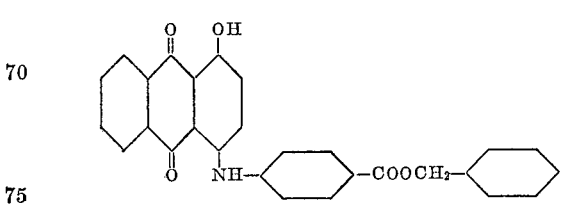

5. Polyethylene terephthalate fibers dyed with the dyestuff of the formula
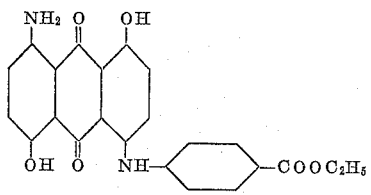
References Cited in the file of this patent
UNITED STATES PATENTS
| | | |
|---|---|---|
| 1,841,674 | Rintelman et al. | Jan. 19, 1932 |
| 2,036,196 | Chappell et al. | Apr. 7, 1936 |
| 2,091,145 | Haddock et al. | Aug. 24, 1937 |
| 2,766,262 | Belshaw | Oct. 9, 1956 |
| 2,895,967 | Straley et al. | July 21, 1959 |
| 2,967,752 | Bucheler | Jan. 10, 1961 |
| 2,982,773 | Grossmann | May 2, 1962 |
FOREIGN PATENTS
| | | |
|---|---|---|
| 554,079 | Belgium | July 10, 1957 |